(12) United States Patent
Hong et al.

(10) Patent No.: US 9,075,515 B2
(45) Date of Patent: Jul. 7, 2015

(54) COMPUTING DEVICE AND CONTROL METHOD THEREOF

(75) Inventors: Sang-jin Hong, Seoul (KR); Ki-young Kim, Incheon (KR); Su-yong Kim, Yongin-si (KR); Mi-ra Eom, Suwon-si (KR); Ji-won Im, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 253 days.

(21) Appl. No.: 13/535,658

(22) Filed: Jun. 28, 2012

(65) Prior Publication Data

US 2013/0106737 A1    May 2, 2013

(30) Foreign Application Priority Data

Oct. 26, 2011 (KR) .................. 10-2011-0109813

(51) Int. Cl.
    G06F 3/041      (2006.01)
    G06F 3/0485     (2013.01)
    G06F 3/0488     (2013.01)
    G06F 3/0481     (2013.01)

(52) U.S. Cl.
    CPC .......... *G06F 3/0485* (2013.01); *G06F 3/04812* (2013.01); *G06F 3/0481* (2013.01); *G06F 3/0488* (2013.01); *G06F 3/04817* (2013.01); *G06F 3/04883* (2013.01)

(58) Field of Classification Search
    CPC . G06F 3/0481; G06F 3/04817; G06F 3/0482; G06F 3/0484; G06F 3/0485
    USPC .......................... 345/173; 715/700, 768, 784
    See application file for complete search history.

(56) References Cited

U.S. PATENT DOCUMENTS

| | | | | |
|---|---|---|---|---|
| 6,741,266 | B1 * | 5/2004 | Kamiwada et al. | 715/768 |
| 2008/0168384 | A1 | 7/2008 | Platzer et al. | |
| 2011/0107264 | A1 * | 5/2011 | Akella | 715/830 |
| 2012/0066627 | A1 * | 3/2012 | Furukawa et al. | 715/768 |

\* cited by examiner

*Primary Examiner* — Jason Mandeville
(74) *Attorney, Agent, or Firm* — Staas & Halsey LLP

(57) ABSTRACT

A computing device including a display unit to display a screen, a touch input to receive a user's touch input on the display unit, and a controller to control the display unit to display at least a part of a plurality of user interface (UI) items on the screen with a predetermined degree of transparency, to scroll the UI items in a predetermined direction and to sequentially display the UI items on the screen according to the user's touch input, and to increase the degree of transparency of the UI items if the UI items are not scrolled any more.

18 Claims, 7 Drawing Sheets

COMPUTING DEVICE AND CONTROL METHOD THEREOF

CROSS-REFERENCE TO RELATED APPLICATIONS

This application claims priority under 35 U.S.C. §119(a) from Korean Patent Application No. 10-2011-0109813, filed on Oct. 26, 2011 in the Korean Intellectual Property Office, the disclosure of which is incorporated herein in its entirety by reference.

BACKGROUND OF THE INVENTION

1. Field of the Invention

Exemplary embodiments of the present general inventive concept relate to a computing device and a control method thereof, and more particularly, to a computing device and a control method thereof to move and display a user interface (UI) item according to a user's touch input.

2. Description of the Related Art

In recent years, a computing device such as tablet PCs, smart phones and smart pads including a touch screen has been widely used. Such a touch-based computing device moves and displays a user interface (UI) item according to a user's touch input. In the case of a plurality UI items, the computing device displays UI items as many as displayable on a screen, and scrolls the UI items shown in a predetermined direction according to the user's touch input and sequentially displays other UI items which have been displayed yet. However, if the UI items are not scrolled any more (i.e., that there are no additional UI items to be displayed by additional touch input from a user in the predetermined direction), a user needs to be informed of such a fact so as not to touch the screen unnecessarily.

SUMMARY OF THE INVENTION

Accordingly, exemplary embodiments of the present general inventive concept provide a computing device and a control method thereof which informs a user of the fact that UI items are not scrolled any more. That is, exemplary embodiments of the present general inventive concept provide a computing device and a control method thereof to inform a user there are no additional UI items to be displayed by additional touch input from a user in the predetermined direction by adjusting the transparency, contrast ration, and/or contrast resolution of the displayed UI items.

Additional features and utilities of the present general inventive concept will be set forth in part in the description which follows and, in part, will be obvious from the description, or may be learned by practice of the general inventive concept.

Exemplary embodiments of the present general inventive concept may provide a computing device including a display unit to display a screen, a touch input unit to receive a user's touch input on the display unit, and a controller to control the display unit to display at least a part of a plurality of user interface (UI) items on the screen with a predetermined degree of transparency, to scroll the UI items in a predetermined direction, and to sequentially display the UI items on the screen according to the user's touch input, and to increase the degree of transparency of the UI items if the UI items are not scrolled any more.

The degree of transparency of the UI items may be increased by the controller so as to correspond to a degree of movement of the touch input received by the touch input unit from the timing when the UI items are not scrolled any more.

The degree of movement of the touch input can include a movement distance of the touch input.

The degree of movement of the touch input may include a movement speed of the touch input.

The degree of transparency of the UI items may be determined by a following formula 1:

$$\text{New\_}x = (x^2/2 - x + 1) * 255 \qquad \text{[Formula 1]}$$

where New_x refers to the degree of transparency of the UI items and x refers to the movement degree of the touch input on the entire screen.

Exemplary embodiments of the present general inventive concept may also provide a method of controlling a computing device, the control method including displaying at least a part of UI items displayable among a plurality of UI items on a screen of a display unit with a predetermined degree of transparency, receiving a user's touch input on the display unit, scrolling the UI items in a predetermined direction and sequentially displaying the plurality of UI items on the screen according to the user's touch input, and increasing the degree of transparency of the UI items if the UI items are not scrolled any more.

The increasing may include increasing the degree of transparency of the UI items corresponding to a degree of movement of the touch input from the timing when the UI items are not scrolled any more.

The degree of movement of the touch input may include a movement distance of the touch input.

The degree of movement of the touch input may include a movement speed of the touch input.

The increasing may include determining the degree of transparency of the UI items by a following formula 1:

$$\text{New\_}x = (x^2/2 - x + 1) * 255$$

where New_x refers to the degree of transparency of the UI items and x refers to the movement degree of the touch input on the entire screen.

Exemplary embodiments of the present general inventive concept may also provide a method of controlling a display of user interface (UI) items on a touchscreen display unit communicatively coupled to a computing device, the method including displaying one or more UI items from among a plurality of UI items on the touchscreen with a predetermined contrast ratio, scrolling and sequentially displaying the UI items in a direction according to a received input touch on the touchscreen display unit, and adjusting the contrast ratio of the displayed UI items to inform a user there are no additional UI items to be displayed of the plurality of UI items by additional touch input from the user in the predetermined direction.

The method may include where the scrolling and sequentially displaying of the UI items is at a speed of movement according to the received input touch.

The method may include where the scrolling and sequentially displaying of the UI items is according to a distance of the received input touch, where the distance is between a first point of contact and a last point of contact of the received input touch.

The method may include that when the contrast ratio is adjusted, resetting the adjusted contrast ratio to a predetermined ratio when a predetermined period of time has elapsed where touch input is not received.

The method may include that when the contrast ratio is adjusted, resetting the adjusted contrast ratio to a predetermined ratio when a second input touch is received in a second direction where there are additional UI items to be displayed.

Exemplary embodiments of the present general inventive concept may also provide a computing device including a display unit to display a screen including one or more user interface (UI) items, a touch input unit to receive a user's touch input on the display unit, and a controller to control the display the one or more UI items from among a plurality of UI items on the display unit with a predetermined contrast ratio, to control a scroll and sequential display of the UI items in a direction according to the received input touch, and to adjust the contrast ratio of the displayed UI items to inform a user there are no additional UI items to be displayed of the plurality of UI items by additional touch input from the user in the predetermined direction.

The controller of the computing device can control the scroll and sequential display of the UI items at a speed of movement according to the received input touch on the touch input unit.

The controller of the computing device can control the scroll and sequential display of the UI items according to a distance of the received input touch determined by the touch input unit, where the distance is between a first point of contact and a last point of contact of the received input touch on the touch input unit.

When the contrast ratio is adjusted by the controller, the controller can reset the adjusted contrast ratio to a predetermined ratio when a predetermined period of time has elapsed where touch input is not received by the touch input unit.

BRIEF DESCRIPTION OF THE DRAWINGS

The above and/or other features and utilities will become apparent and more readily appreciated from the following description of the exemplary embodiments, taken in conjunction with the accompanying drawings, in which.

DETAILED DESCRIPTION OF THE PREFERRED EMBODIMENTS

Figure 1:
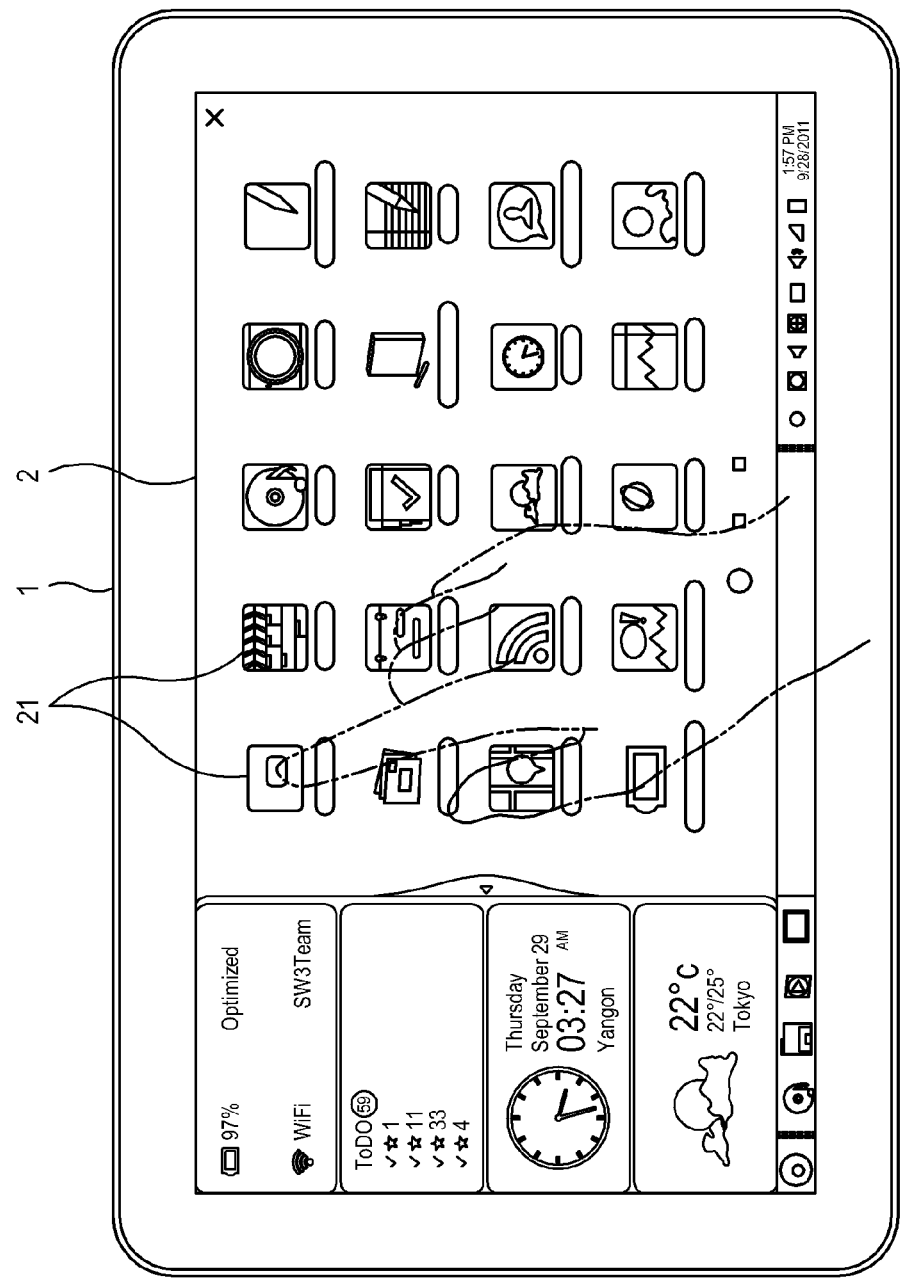
FIG. 1 illustrates a computing device according to exemplary embodiments of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Hereinafter, a computing device and a control method according to exemplary embodiments of the present general inventive concept will be described in detail.

FIG. 1 illustrates a computing device 1 according to exemplary embodiments of the present general inventive concept.

The computing device 1 may include a tablet PC (personal computer), a smart phone or a smart pad. Alternatively, the computing device 1 may include a laptop computer, a notebook computer, and/or any other suitable computing device to carry out the exemplary embodiments of the present inventive concept. The computing device 1 can display user interface (UI) items 21 on a screen 2. The screen 2 may be part of the computing device 1, and/or may be communicatively coupled to the computing device 1. The UI items 21 may correspond to predetermined applications, respectively. That is, selection of one or more of the UI items 21 may execute an application program. The computing device 1 can scroll and display the UI items 21 in a predetermined direction according to a user's touch input. For example, the computing device 1 can scroll the UI items in the same direction as the user's touch input. In exemplary embodiments of the present general inventive concept, the screen 2 can display a part of the plurality of UI items 21, and can sequentially display other UI items 21 by scrolling and moving the UI items 21 that are displayed, according to a user' touch input.

If the UI items 21 are not scrolled any more, i.e., if a user touches the screen 2 continuously even though there are no more UI items that have not been shown (i.e., there are no additional UI items to be displayed according to the received user touch input in the predetermined direction), the computing device 1 adjusts the display of the UI items 21 to make the UI items 21 transparent to inform a user that the UI items 21 are not scrolled any more (i.e., that there are no additional items to be displayed according to the received user touch input in the predetermined direction). Alternatively, the computing device 1 may change the contrast resolution and/or contrast ration of the UI items 21 to inform a user that the UI items 21 are not scrolled any more. For example, as illustrated in screen 61 of FIG. 6, the UI items 62 (e.g., where UI items 62 are similar to UI items 21) may be adjusted so as to be transparent and/or the contrast resolution (and/or contrast ratio) may be changed so as to inform a user that there are no additional items to be displayed according to the received user touch input in the predetermined direction. As the computing device 1 can adjust the display of the UI items 21 to inform the user there are no additional items to be displayed according to the received user touch input in the predetermined direction, this may improve a user's convenience.

Figure 2:
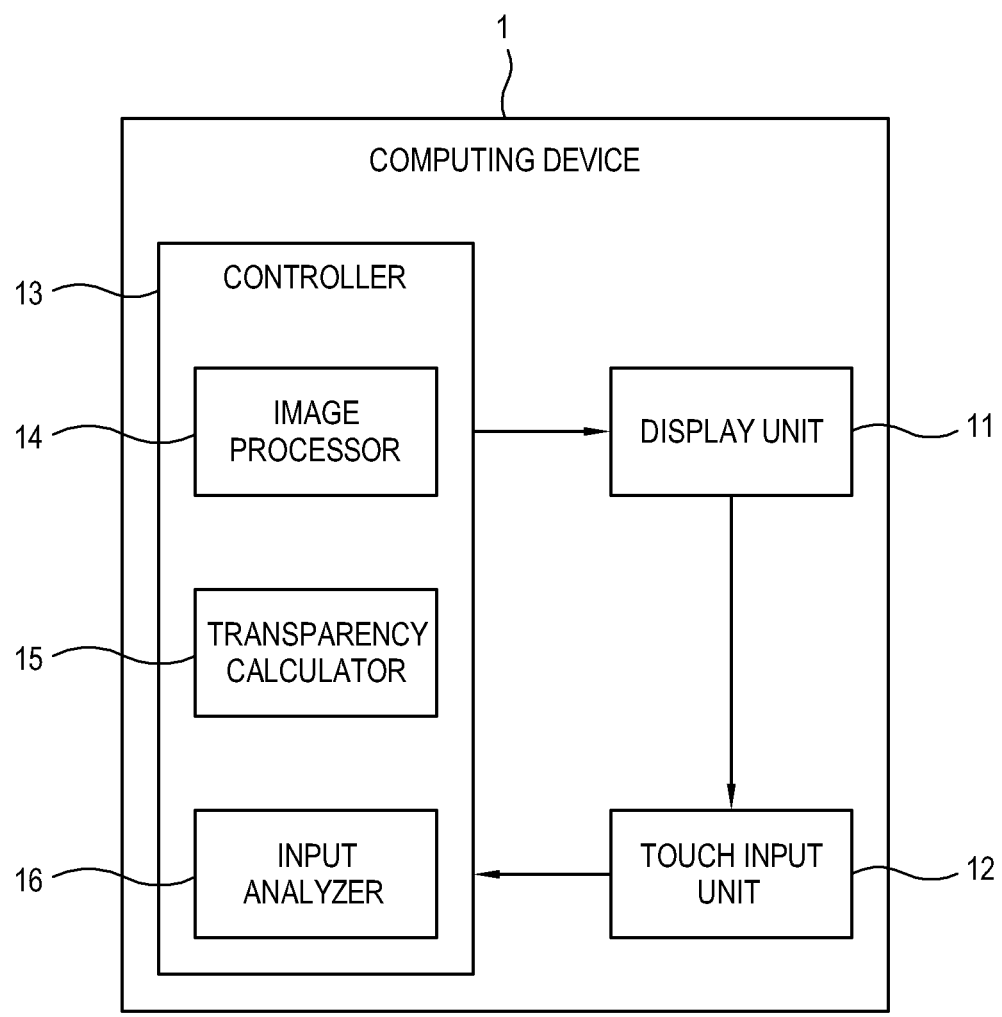
FIG. 2 is a block diagram illustrating the computing device in FIG. 1 according to exemplary embodiments of the present general inventive concept.

FIG. 2 is a block diagram illustrating the computing device 1 of FIG. 1. As illustrated therein, the computing device 1 can include a display unit 11, a touch input unit 12 and a controller 13. The display unit 11 can display the UI items 21 on the screen 2. The display unit 11 may be a liquid crystal display (LCD), a light emitting diode (LED) display, an organic LED display, and/or any other suitable display to carry out the exemplary embodiment of the present general inventive concept. The display unit 11 may be integrated with the computing device 1, and/or may be communicatively coupled so as to be external to the computing device 1. The touch input unit 12 can receive a user's touch input on the screen 2 of the display unit 11. The touch input unit may be a sensor and/or processor to receive the input touch and determine the position and/or location of the user's input touch. The controller 13 can scroll and display the UI items 21 in a predetermined direction according to a user's touch input on the display unit 11. The controller 13 can increase the degree of transparency, adjust the contrast ratio, and/or adjust the contrast resolution of the UI items 21 which are displayed currently on the display unit 11 if the UI items 21 are not scrolled any more (e.g., where there are no additional UI items 21 to be displayed according to the direction of the received user input touch). The controller 13 may be and/or include a processor, an integrated circuit, a field programmable gate array, a programmable logic device, and/or any other suitable controller to carry out the exemplary embodiments of the present general inventive concept and disclosed herein.

The controller 13 may include an image processor 14, a transparency calculator 15 and an input analyzer 16. The image processor 14 can process an image to display the UI items 21 on the screen 2. The image processor 14 may be an integrated circuit, a field programmable gate array, a programmable logic device, and/or any other suitable processor to carry out the exemplary embodiments of the present general inventive concept and disclosed herein. The transparency calculator 15 can calculate the degree (e.g., amount) of transparency which is required for changing the degree of transparency of the UI items 21. In exemplary embodiments of the present general inventive concept, the transparency calculator 15 may calculate the contrast ratio or the contrast resolution to adjust the UI items displayed on the display unit 21 so as to inform the user there are no additional items to be displayed according to the received user touch input in the predetermined direction. The transparency calculator may be a processor, an integrated circuit, a field programmable gate array, a programmable logic device, and/or any other suitable device to carry out the exemplary embodiments of the present general inventive concept and disclosed herein. The input analyzer 16 can analyze a user's touch input which is received through the touch input unit 12. That is, the input analyzer 16 can determine, for example, at least one of the direction, speed, duration, frequency, and/or magnitude of a user's touch input. The input analyzer 16 may be a processor, an integrated circuit, a field programmable gate array, a programmable logic device, and/or any other suitable device to carry out the exemplary embodiments of the present general inventive concept and disclosed herein. The controller 13 may include a computer program, a non-volatile memory storing the computer program therein, a volatile memory loading at least a part of the computer program and a microprocessor executing the loaded computer program. The computer program of the controller 13 may include a basic input output system (BIOS), operating system (OS), device driver, application program, etc.

Figure 3:
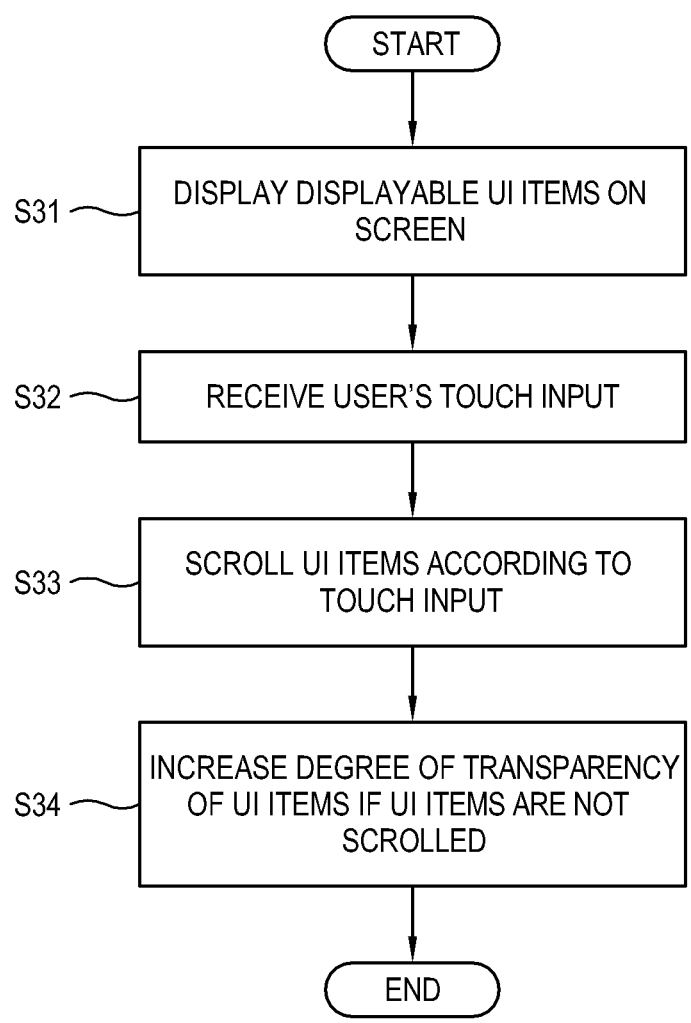
FIG. 3 is a control flowchart illustrating a control method of the computing device in FIG. 1 according to exemplary embodiments of the present general inventive concept.
Figure 4:
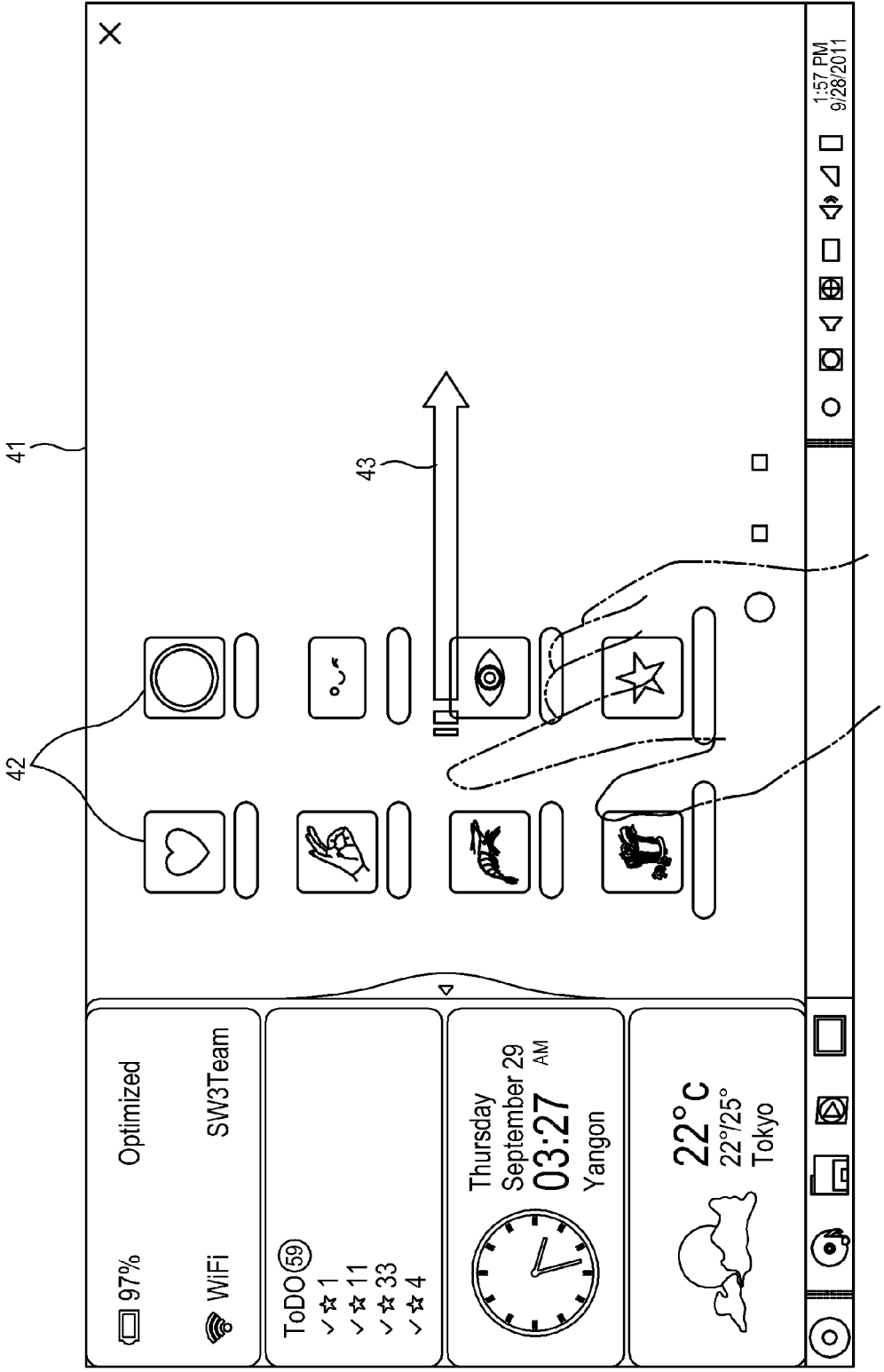
FIGS. 4 to 6 illustrate an example of a screen on which the computing device in FIG. 1 displays UI items according to exemplary embodiments of the present general inventive concept.
Figure 5:
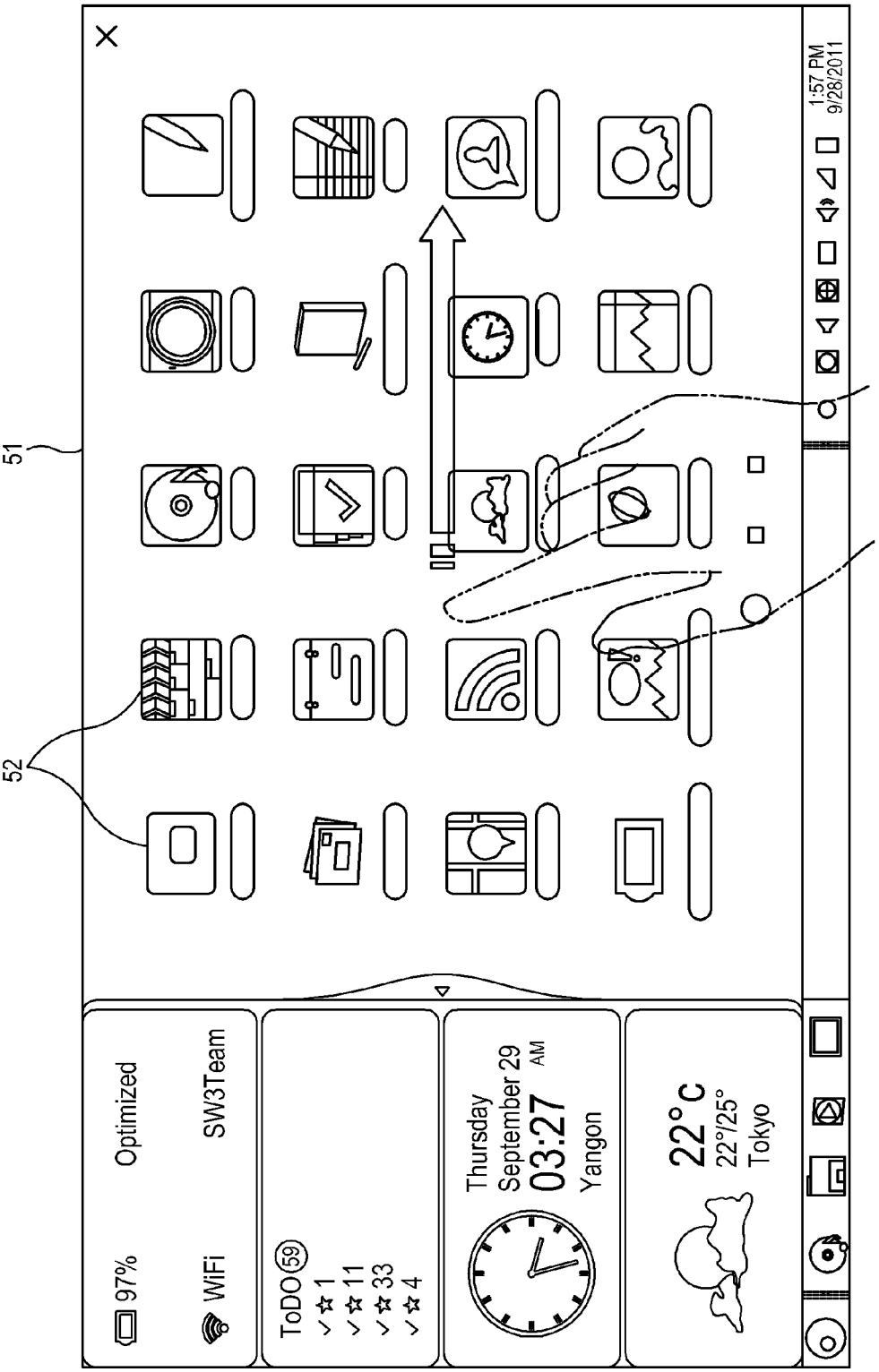
Figure 6:
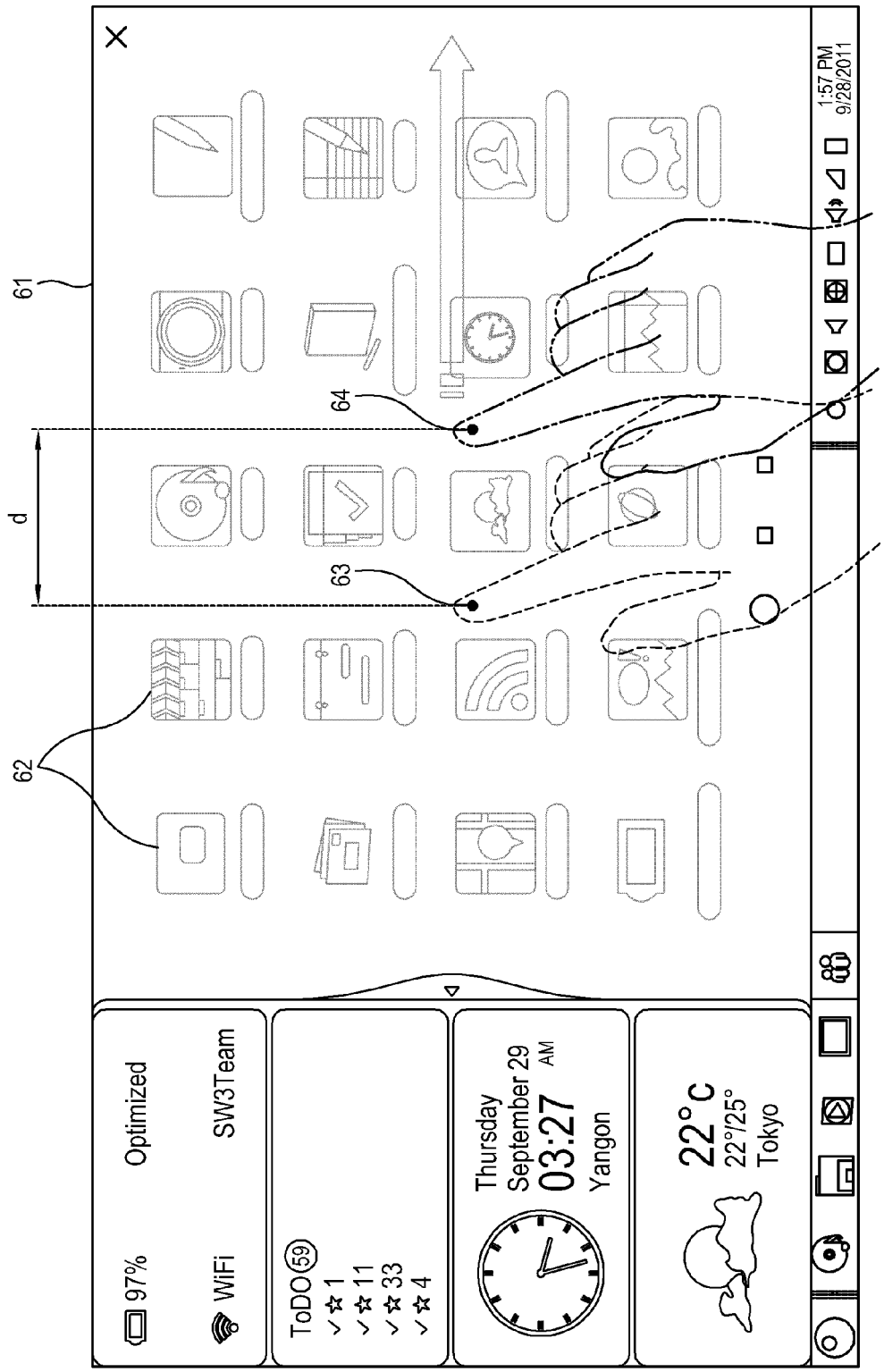

FIG. 3 illustrates a method of controlling the computing device 1 of FIG. 1 according to exemplary embodiments of the present general inventive concept. At operation S31, the computing device 1 can display UI items which are displayable on the screen (e.g., screen 2 illustrated in FIG. 1). FIGS. 4 to 6 illustrate screens which display UI items according to exemplary embodiments of the present general inventive concept. As illustrated in FIG. 4, a screen 41 displays UI items 42. The screen 41 of FIG. 4 may be displayed by the computing device 1 illustrated in FIGS. 1 and 2. The UI items 42 can be displayed in the left side of a display area of the screen 41.

At operation S32 in FIG. 3, the computing device 1 can receive a user's touch input. For example, as illustrated in FIG. 4, a user may input a touch as if sliding to the right side to view the UI items which have not been displayed, by scrolling the UI items 42 to the right side 43 (e.g., in a direction indicated by right side 43 arrow) of the screen 41. At operation S33 in FIG. 3, the computing device 1 can scroll the UI items 42 according to a received user's touch input. For example, as illustrated in FIG. 4, the computing device 1 can scroll the UI items 42 displayed on the screen 41 to the right side, and, as illustrated in FIG. 5, displays UI items 52 which have not been displayed on a screen 51.

At operation S34 illustrated in FIG. 3, the computing device 1 can increase the degree of transparency (or, alternatively, can change the contrast ratio and/or contrast resolution) of the UI items if the UI items are not scrolled any more. For example, if the screen 41 in FIG. 5 may not scroll the UI items 52 anymore (i.e., there are no more UI items to scroll that may be sequentially displayed in the scrolling direction received from the user's touch input), the computing device 1 can increase the degree of transparency (or, alternatively, can change the contrast ratio and/or contrast resolution) of UI items 62 displayed on a screen 61 as illustrated in FIG. 6. That is, the UI items 62 become transparent on the screen 61. Alternatively, the contrast ratio and/or contrast resolution of the UI items 62 can be changed, and the adjusted UI items 62 can be displayed on the screen 61 so as to inform the user there are no additional items to be displayed according to the received user touch input in the predetermined direction.

Figure 7:
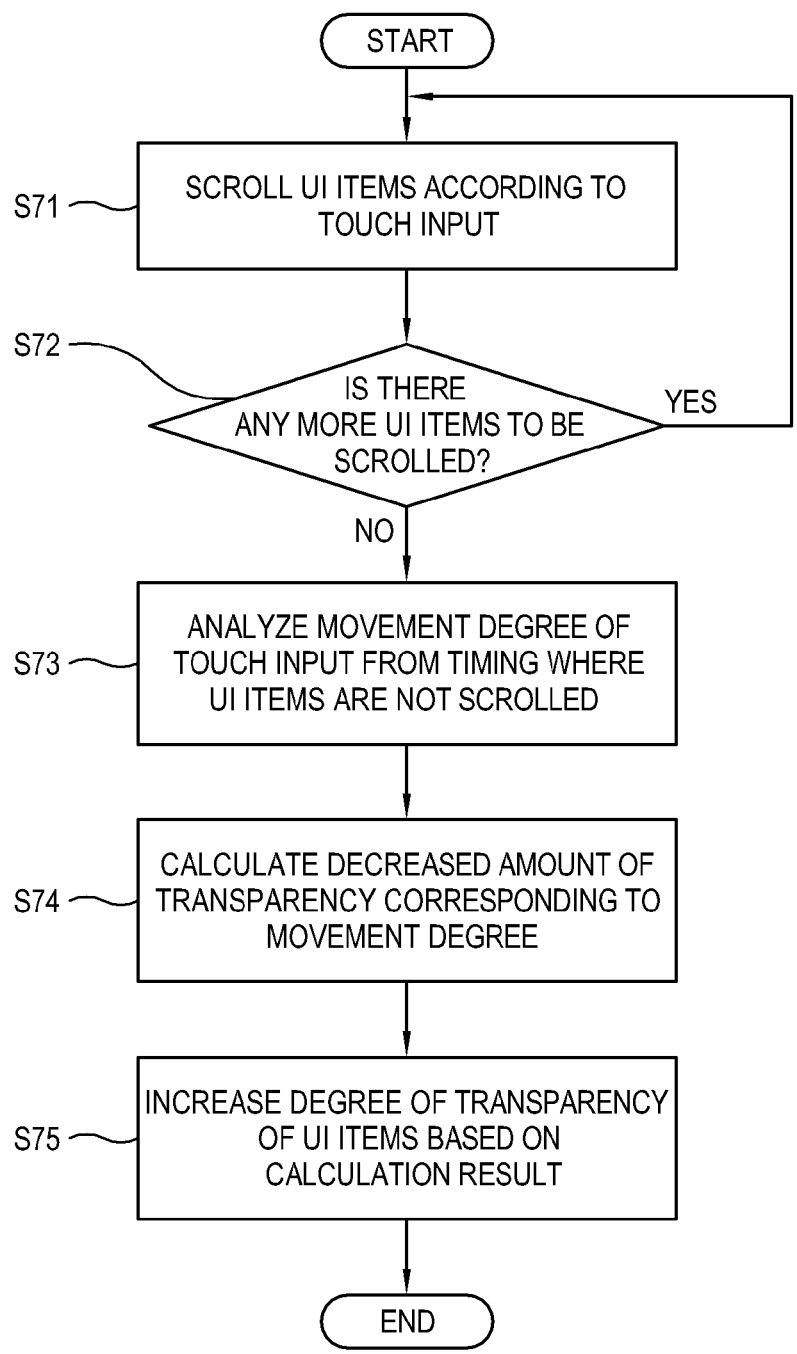
FIG. 7 illustrates a control flowchart of the control method of the computing device in FIG. 1 according to exemplary embodiments of the present general inventive concept.

The computing device 1 may increase the degree of transparency of UI items corresponding to the degree of movement of the user's touch input. Alternatively, the computing device 1 may change the contrast ratio and/or contrast resolution of the UI items corresponding to the amount of movement of the user's touch input. FIG. 7 illustrates a method of controlling the computing device 1 according to exemplary embodiments of the present general inventive concept. At operation S71, the computing device 1 can scroll the UI items according to a received user's touch input. If it is determined that there are UI items to be scrolled at operation S72 (that is, there are additional items that can be displayed when a user input touch is received in a predetermined direction), the computing device 1 can continuously scroll the UI items at operation S71. If it is determined that there is no more UI item to be scrolled at operation S72 (that is, there are no additional items that can be displayed when a user input touch is received in a predetermined direction), the computing device 1 can analyze and/or determine the degree of movement (i.e., amount, distance of touch path, etc.) of the user's touch input from the timing when the UI items are not scrolled at operation S73. For example, as illustrated in FIG. 6, the computing device 1 may determine a distance d from a location of the touch input 63 to a location of the moved touch input 64 at the time when the UI items 62 are not scrolled.

At operation S74, the computing device 1 can calculate the degree of transparency corresponding to the degree of movement of the touch input. The computing device 1 may calculate the degree of transparency by a formula 1 as follows:

$$\text{New}\_x = (x^2/2 - x + 1) \ast 255 \qquad \text{[Formula 1]}$$

where New_x refers to the degree (i.e., amount) of transparency of the UI items, and x refers to the degree (i.e., amount) of movement of the touch input on the entire screen. If the degree of movement is zero, i.e., x=0, New_x equals 255, and UI items can have the original degree of transparency. The larger the degree of movement x is, the smaller the value of the transparency (New_x) is, and this makes the UI items transparent gradually. If the degree of movement x is maximum (e.g., x=255) and New_x equals zero, the UI items are transparent in full.

In the case of the screen 61 in FIG. 6, the computing device 1 reflects the movement distance d of the touch input from the timing when the UI items 62 are not scrolled any more, to the degree of movement x in the [Formula 1] above, to thereby calculate the increased degree of transparency (New_x) of the UI items 62. At operation S75 in FIG. 7, the computing device 1 can increase the degree of transparency of the UI items 62 according to the calculated degree of transparency (New_x).

If the user's touch input is suspended while the degree of transparency of the UI items 62 has been increased, the computing device 1 can restore the degree of transparency of the UI items 62 to the original degree. That is, if the user's touch input is suspended in the state of the screen 61 in FIG. 6, the degree of transparency of the UI items is decreased and becomes the state as in the screen 51 in FIG. 5. Alternatively, if the user's touch input is suspended while the contrast ratio and/or contrast resolution of the UI items 62 has been adjusted, the computing device 1 can restore the contrast ratio and/or contrast resolution of the UI items 62 to the original contrast ratio and/or contrast resolution.

According to exemplary embodiments of the present general inventive concept, the computing device 1 may increase the degree of transparency of the UI items corresponding to the movement speed of the touch input. This example may apply to the case where the UI items continue to move according to the direction and speed of the touch input, which was implemented in a predetermined direction and then suspended as a user's finger is not in contact with the display unit 11 (the case where a user feels the effect of inertia). For example, if the movement speed of the touch input at the timing when a user's finger is not in contact with the display unit 11 has a predetermined rate of speed (i.e., the movement speed is fast), the increased amount of the degree of transparency may be a predetermined high transparency (e.g., the transparency may be large). If the movement speed of the touch input is less than the predetermined rate of speed (e.g., the movement speed is slow), the increased amount of the degree of transparency may be small. As there is no more touch input, the degree of transparency returns to its original degree after being increased for predetermined time.

As described above, a computing device and a control method thereof according to the present general inventive concept may inform a user of the fact that UI items are not scrolled any more. That is, the computing device and the control method thereof inform the user that there are no additional UI items to be displayed by additional touch input from a user in the predetermined direction by adjusting the transparency, contrast ratio, and/or contrast resolution of the displayed UI items.

Although a few exemplary embodiments have been shown and described, it will be appreciated by those skilled in the art that changes may be made in these exemplary embodiments without departing from the principles and spirit of the invention, the range of which is defined in the appended claims and their equivalents.

What is claimed is:

1. A computing device comprising:
a display unit to display a screen;
a touch input unit to receive a user's touch input on the display unit; and
a controller to control the display unit to display at least a part of a plurality of user interface (UI) items on the screen with a degree of transparency, to scroll the UI items in a direction corresponding to a direction of the user's touch input and to sequentially display the UI items on the screen according to the user's touch input, and to increase the degree of transparency of the UI items while a position of the displayed UI items on the screen remains from a timing when there are no additional UI items to be displayed according to the direction of the received user touch input,
wherein the controller increases the degree of transparency of the UI items so as to correspond to a degree of movement of the touch input received by the touch input unit from the timing when there are no additional UI items to be displayed according to the direction of the received user touch input.

2. The computing device according to claim 1, wherein the degree of movement of the touch input comprises a movement distance of the touch input.

3. The computing device according to claim 1, wherein the degree of movement of the touch input comprises a movement speed of the touch input.

4. The computing device according to claim 1, wherein the degree of transparency of the UI items is determined by a following formula 1:

$$\text{New\_}x = (x^2/2 - x + 1) * 255 \quad \text{[Formula 1]}$$

wherein, New_x refers to the degree of transparency of the UI items and x refers to the movement degree of the touch input on the screen.

5. A method of controlling a computing device, the method comprising:
displaying at least a part of UI (user interface) items displayable among a plurality of UI items on a screen of a display unit with a degree of transparency;
receiving a user's touch input on the display unit;
scrolling the UI items in a direction corresponding to a direction of the user's touch input and sequentially displaying the plurality of UI items on the screen according to the user's touch input; and
increasing the degree of transparency of the UI items while a position of the displayed UI items on the screen remains from a timing when there are no additional UI items to be displayed according to the direction of the received user touch input,
wherein the increasing the degree of transparency comprises increasing the degree of transparency of the UI items corresponding to a degree of movement of the touch input from the timing when there are no additional UI items to be displayed according to the direction of the received user touch input.

6. The method of claim 5, wherein the degree of movement of the touch input comprises a movement distance of the touch input.

7. The method of claim 5, wherein the degree of movement of the touch input comprises a movement speed of the touch input.

8. The computing device according to claim 5, wherein the increasing comprises determining the degree of transparency of the UI items by a following formula 1:

$$\text{New\_}x = (x^2/2 - x + 1) * 255 \quad \text{[Formula 1]}$$

wherein, New_x refers to the degree of transparency of the UI items and x refers to the movement degree of the touch input on the screen.

9. A method of controlling a display of user interface (UI) items on a touchscreen display unit communicatively coupled to a computing device, the method comprising:
displaying one or more UI items from among a plurality of UI items on the touchscreen with a contrast ratio;
scrolling and sequentially displaying the UI items in a direction according to a direction of a received input touch on the touchscreen display unit; and
adjusting the contrast ratio of the displayed UI items while a position of the displayed UI items on the screen remains to inform a user there are no additional UI items to be displayed of the plurality of UI items by additional touch input from the user in the direction of the received input touch,
wherein the adjusting the contrast ratio comprises adjusting the contrast ratio of the displayed UI items corresponding to a degree of movement of the touch input from a timing when there are no additional UI items to be displayed according to the direction of the received input touch.

10. The method of claim 9, wherein the scrolling and sequentially displaying of the UI items is at a speed of movement according to the received input touch.

11. The method of claim 9, wherein the scrolling and sequentially displaying of the UI items is according to a distance of the received input touch, where the distance is between a first point of contact and a last point of contact of the received input touch.

12. The method of claim 9, wherein when the contrast ratio is adjusted, resetting the adjusted contrast ratio to a predetermined ratio when a period of time has elapsed where touch input is not received.

13. The method claim 9, wherein when the contrast ratio is adjusted, resetting the adjusted contrast ratio to a ratio when a second input touch is received in a second direction where there are additional UI items to be displayed.

14. A computing device comprising:
a display unit to display a screen including one or more user interface (UI) items;
a touch input unit to receive a user's touch input on the display unit; and
a controller to control the display unit to display the one or more UI items from among a plurality of UI items on the display unit with a contrast ratio, to control a scroll and sequential display of the UI items in a direction according to a direction of the received input touch, and to adjust the contrast ratio of the displayed UI items while a position of each of the displayed UI items on the screen remains to inform a user there are no additional UI items to be displayed of the plurality of UI items by additional touch input from the user in the direction of the received input touch,
wherein the controller adjusts the contrast ratio of the displayed UI items so as to correspond to a degree of movement of the touch input received by the touch input unit from a timing when there are no additional UI items to be displayed according to the direction of the received user touch input.

15. The computing device of claim 14, wherein the controller controls the scroll and sequential display of the UI items at a speed of movement according to the received input touch on the touch input unit.

16. The computing device of claim 14, wherein the controller controls the scroll and sequential display of the UI items according to a distance of the received input touch determined by the touch input unit, where the distance is between a first point of contact and a last point of contact of the received input touch on the touch input unit.

17. The computing device of claim 14, wherein when the contrast ratio is adjusted by the controller, the controller resets the adjusted contrast ratio to a ratio when a period of time has elapsed where touch input is not received by the touch input unit.

18. The computing device of claim 14, wherein when the contrast ratio is adjusted by the controller, the controller resets the adjusted contrast ratio to a ratio when a second input touch is received by the touch input unit in a second direction where there are additional UI items to be displayed.

* * * * *

UNITED STATES PATENT AND TRADEMARK OFFICE
CERTIFICATE OF CORRECTION

| | | |
|---|---|---|
| PATENT NO. | : 9,075,515 B2 | Page 1 of 1 |
| APPLICATION NO. | : 13/535658 | |
| DATED | : July 7, 2015 | |
| INVENTOR(S) | : Sang-jin Hong et al. | |

It is certified that error appears in the above-identified patent and that said Letters Patent is hereby corrected as shown below:

In the claims

Claim 8, Column 8, Line 43 (Approximately)

Delete "computing device according to" and insert --method of--, therefor.

Claim 12, Column 9, Lines 13-14 (Approximately)

Delete "predetermined ratio" and insert --ratio--, therefor.

Claim 13, Column 9, Line 16 (Approximately)

After "method" insert --of--.

Signed and Sealed this
Twenty-seventh Day of October, 2015

Michelle K. Lee
*Director of the United States Patent and Trademark Office*